US 11,946,548 B2

(12) United States Patent
Sonokawa et al.

(10) Patent No.: US 11,946,548 B2
(45) Date of Patent: Apr. 2, 2024

(54) COIL SPRING CARBON FACE SEAL

(71) Applicant: Raytheon Technologies Corporation, Farmington, CT (US)

(72) Inventors: Masayoshi Sonokawa, West Hartford, CT (US); Jonathan F. Zimmitti, Glastonbury, CT (US); Nasr A. Shuaib, Watertown, MA (US); Sean P. McCutchan, Wethersfield, CT (US)

(73) Assignee: RTX Corporation, Farmington, CT (US)

( * ) Notice: Subject to any disclaimer, the term of this patent is extended or adjusted under 35 U.S.C. 154(b) by 0 days.

(21) Appl. No.: 17/746,221

(22) Filed: May 17, 2022

(65) Prior Publication Data

US 2022/0403937 A1    Dec. 22, 2022

Related U.S. Application Data

(60) Provisional application No. 63/211,143, filed on Jun. 16, 2021.

(51) Int. Cl.
*F16J 15/34*    (2006.01)
(52) U.S. Cl.
CPC .................. *F16J 15/3452* (2013.01)
(58) Field of Classification Search
CPC ....... F16J 15/34; F16J 15/3436; F16J 15/3452
See application file for complete search history.

(56) References Cited

U.S. PATENT DOCUMENTS

| 3,042,414 A | 7/1962 | Tracy |
| 3,743,303 A | 7/1973 | Pope |
| 4,406,466 A * | 9/1983 | Geary, Jr. ............ F16J 15/3412 277/400 |
| 5,558,341 A | 9/1996 | McNickle et al. |
| 8,342,534 B2 | 1/2013 | Vasagar et al. |
| 9,353,639 B2 | 5/2016 | Garrison |
| 10,234,036 B2 | 3/2019 | Lewis |

(Continued)

FOREIGN PATENT DOCUMENTS

| CN | 204553900 U | 8/2015 |
| JP | S5582859 A | 6/1980 |

(Continued)

OTHER PUBLICATIONS

European Search Report dated Oct. 12, 2022 for European Patent Application No. 22179138.7.

(Continued)

*Primary Examiner* — Gilbert Y Lee
(74) *Attorney, Agent, or Firm* — Bachman & LaPointe, P.C.

(57) ABSTRACT

An apparatus has: a first member; a shaft rotatable relative to the first member about an axis; and a seal system. The seal system has: a seal carried by the first member and having a seal face; a seal housing; a seat carried by the shaft and having a seat face in sliding sealing engagement with the seal face; and a plurality of coil springs biasing the seal face against the seat face, each coil spring having a first end and a second end. The seal has a plurality of spring compartments. Each of the plurality of coil springs is partially within a respective associated compartment of the plurality of spring compartments.

21 Claims, 5 Drawing Sheets

(56) References Cited

U.S. PATENT DOCUMENTS

| | | | | |
|---|---|---|---|---|
| 2010/0117303 A1* | 5/2010 | Takahashi | ............ | F16J 15/3404 |
| | | | | 277/352 |
| 2012/0139186 A1* | 6/2012 | Suefuji | .................. | F16J 15/36 |
| | | | | 277/377 |
| 2014/0062028 A1 | 3/2014 | Haynes | | |
| 2015/0275684 A1* | 10/2015 | Thatte | .................. | F01D 11/001 |
| | | | | 415/230 |
| 2019/0040957 A1 | 2/2019 | Miller et al. | | |
| 2020/0173556 A1 | 6/2020 | Fadgen et al. | | |
| 2022/0162994 A1 | 5/2022 | Miller et al. | | |

FOREIGN PATENT DOCUMENTS

| | | | |
|---|---|---|---|
| JP | WO2008142945 A1 * | 8/2010 | |
| WO | 2018/005846 A1 | 1/2018 | |

OTHER PUBLICATIONS

European Office action dated Jul. 14, 2023 for European Patent Application No. 22179138.7.

* cited by examiner

COIL SPRING CARBON FACE SEAL

CROSS-REFERENCE TO RELATED APPLICATION

Benefit is claimed of U.S. Patent Application No. 63/211,143, filed Jun. 16, 2021, and entitled "Coil Spring Carbon Face Seal", the disclosure of which is incorporated by reference herein in its entirety as if set forth at length.

BACKGROUND

The disclosure relates to gas turbine engines. More particularly, the disclosure relates to carbon seal systems.

Carbon seals are commonly used to seal between relatively rotating components in gas turbine engines (used in propulsion and power applications and broadly inclusive of turbojets, turboprops, turbofans, turboshafts, industrial gas turbines, and the like). These include shaft seals (i.e., where the sealing surfaces of seal and seat face radially (e.g., within 1.0° or essentially 0°) and extend axially) and face seals (i.e., where the sealing surfaces face axially (e.g., within 1.0° or essentially 0°) and extend radially). In typical face seal situations, the annular carbon seal is axially spring biased into engagement with an annular seat (typically metallic such as a steel). Often, the carbon seal is on non-rotating static structure and the seat rotates with one of the engine shafts. The sliding engagement causes frictional heating. The heat must be dissipated. With a rotating seat, it is common to use oil cooling. Generally, oil cooled carbon seals are divided into two categories: "dry face" seals wherein the oil passes through passageways in the seat without encountering the interface between seal face and seat face; and "wet face" seals wherein the oil passes through the seat to the interface so that the oil that flows through the seat cools the seat but then lubricates the interface to further reduce heat generation.

For both forms of seals, the oil may be delivered through a nozzle and slung radially outward by the rotating component and collected in a radially outwardly closed and inwardly open collection channel from which the passageways extend further radially outward.

SUMMARY

One aspect of the disclosure involves an apparatus comprising: a first member; a shaft rotatable relative to the first member about an axis; and a seal system. The seal system has: a seal carried by the first member and having a seal face; a seal housing; a seat carried by the shaft and having a seat face in sliding sealing engagement with the seal face; and a plurality of coil springs biasing the seal face against the seat face, each coil spring having a first end and a second end. The seal has a plurality of spring compartments. Each of the plurality of coil springs is partially within a respective associated compartment of the plurality of spring compartments.

In a further embodiment of any of the foregoing embodiments, additionally and/or alternatively, the plurality of spring compartments each comprise an outward radial opening.

In a further embodiment of any of the foregoing embodiments, additionally and/or alternatively, the apparatus further comprises a plurality of caps each having a sidewall and a base. Each of the plurality of coil springs has an end portion at the second end in an associated cap of the plurality of caps.

In a further embodiment of any of the foregoing embodiments, additionally and/or alternatively, the plurality of spring compartments each comprise: a base portion receiving the associated cap; and a shoulder separating the base portion from a broader portion.

In a further embodiment of any of the foregoing embodiments, additionally and/or alternatively, the plurality of spring compartments each comprise a port open to the base portion.

In a further embodiment of any of the foregoing embodiments, additionally and/or alternatively, the apparatus further comprises a spring carrier within the housing and having a plurality of projections each respectively received in an associated spring of the plurality of coil springs and wherein the plurality of springs bias the seal away from the spring carrier.

In a further embodiment of any of the foregoing embodiments, additionally and/or alternatively, the spring carrier has an annular plate portion from which the projections axially project.

In a further embodiment of any of the foregoing embodiments, additionally and/or alternatively, the spring carrier plate portion and housing have complementary interfitting features restricting relative rotation.

In a further embodiment of any of the foregoing embodiments, additionally and/or alternatively, each compartment of the plurality of compartments is formed in an outward radial projection of the seal having respective first and second circumferential ends and interfitting with complementary features of the housing to restrict relative rotation.

In a further embodiment of any of the foregoing embodiments, additionally and/or alternatively, the seal is a carbon seal.

In a further embodiment of any of the foregoing embodiments, additionally and/or alternatively, the seat is steel.

In a further embodiment of any of the foregoing embodiments, additionally and/or alternatively, the seal is a single piece.

In a further embodiment of any of the foregoing embodiments, additionally and/or alternatively, the apparatus further comprises an internal snap ring captured in an internal groove of the housing and positioned to limit movement of the seal.

In a further embodiment of any of the foregoing embodiments, additionally and/or alternatively, the apparatus further comprises a seal ring captured in an outwardly-open channel of the housing and engaging an inner diameter surface of the seal.

In a further embodiment of any of the foregoing embodiments, additionally and/or alternatively, the apparatus is a gas turbine engine.

Another aspect of the disclosure involves carbon seal comprising in a single piece: a sealing face circumscribing a central longitudinal axis; and a plurality of compartments each having a first axial opening axially opposite the sealing face.

In a further embodiment of any of the foregoing embodiments, additionally and/or alternatively, each compartment of the plurality of compartments has an outward radial opening contiguous with that compartment's first axial opening.

In a further embodiment of any of the foregoing embodiments, additionally and/or alternatively, each compartment of the plurality of compartments is formed in an outward radial projection of the carbon seal having respective first and second circumferential ends.

In a further embodiment of any of the foregoing embodiments, additionally and/or alternatively, each compai linent of the plurality of compartments has a second axial opening axially opposite to and smaller than that compartment's first axial opening.

In a further embodiment of any of the foregoing embodiments, additionally and/or alternatively, the carbon seal is at least 90% carbon by weight.

In a further embodiment of any of the foregoing embodiments, additionally and/or alternatively, each compartment of the plurality of compartments has: a base portion (e.g., for receiving an associated spring cap); and a shoulder separating the base portion from a broader portion.

The details of one or more embodiments are set forth in the accompanying drawings and the description below. Other features, objects, and advantages will be apparent from the description and drawings, and from the claims.

BRIEF DESCRIPTION OF THE DRAWINGS

Like reference numbers and designations in the various drawings indicate like elements.

DETAILED DESCRIPTION

Figure 1:
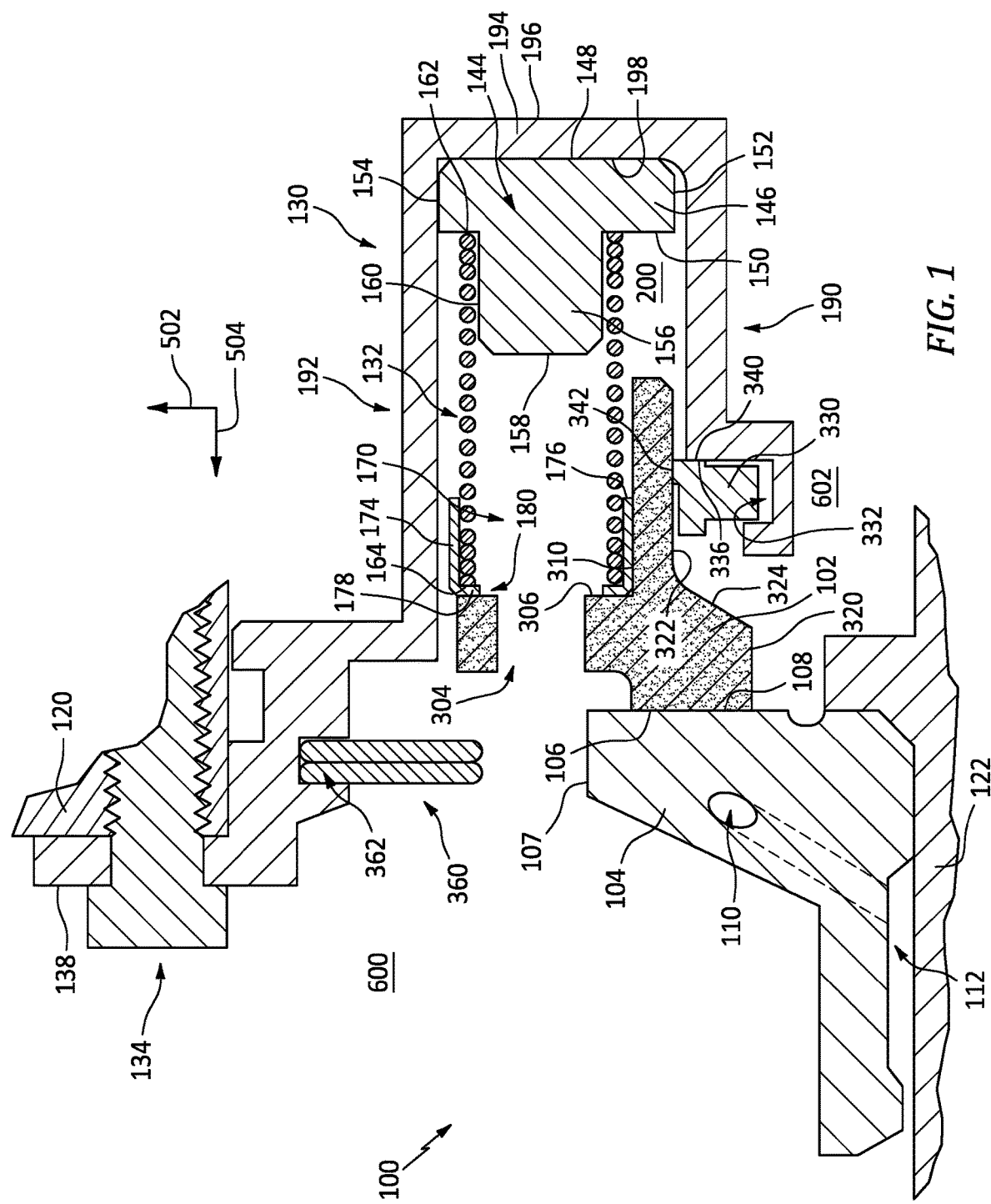
FIG. 1 is a first axial sectional view of a seal system in a turbomachine taken through a bias spring.
Figure 2:
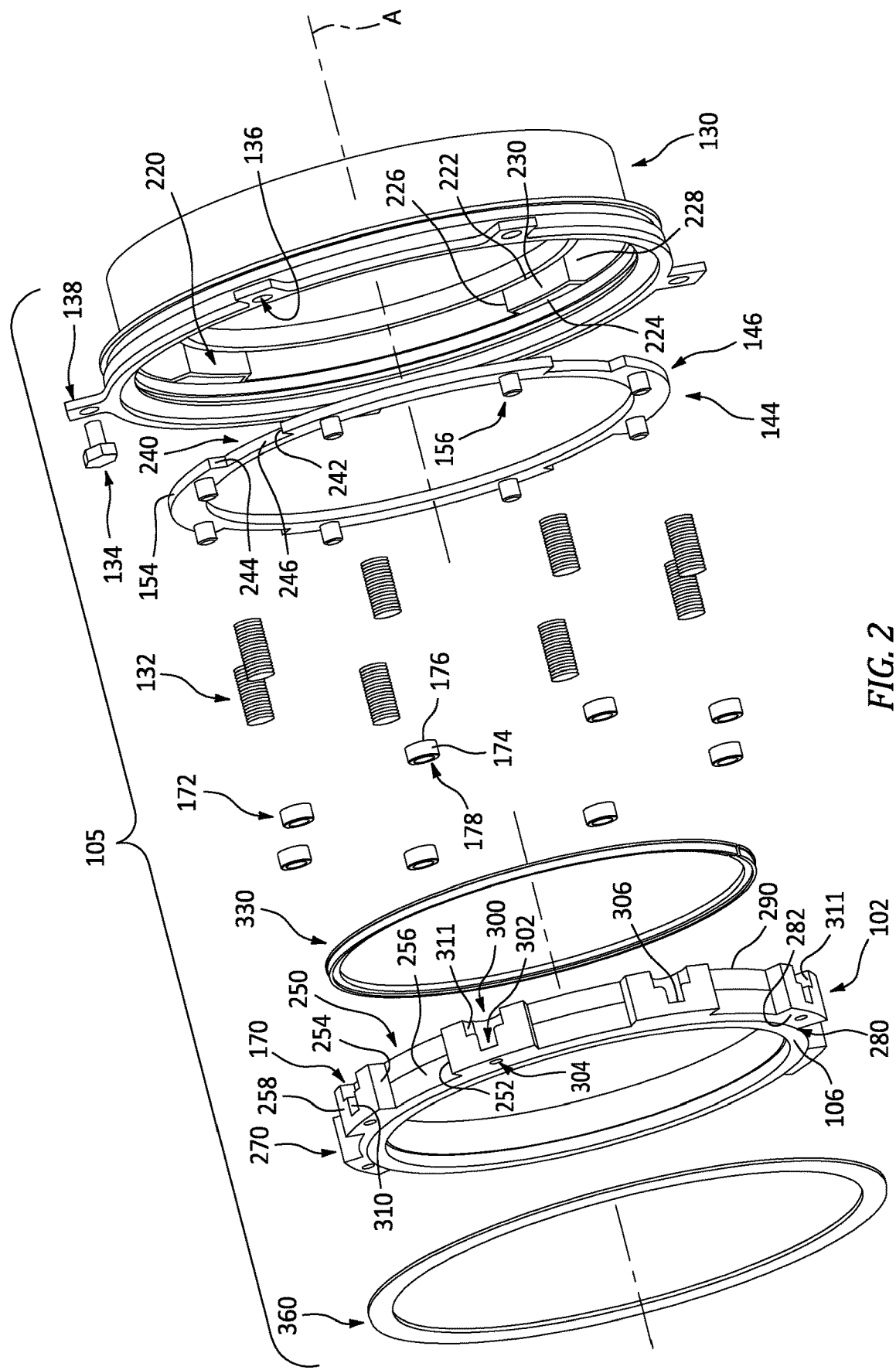
FIG. 2 is a first exploded view of a cartridge subassembly of the seal system.
Figure 3:
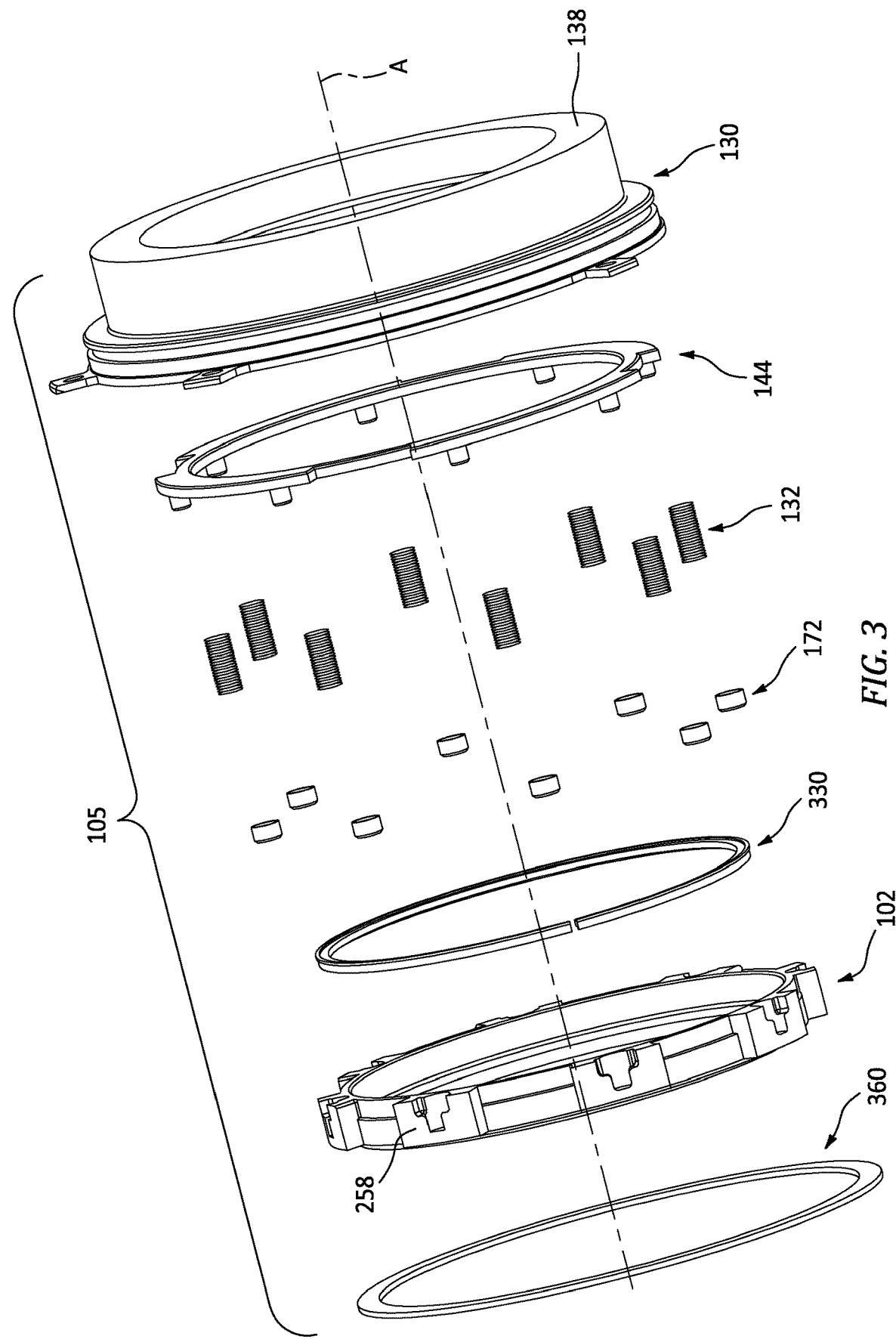
FIG. 3 is a second exploded view of the cartridge subassembly.
Figure 4:
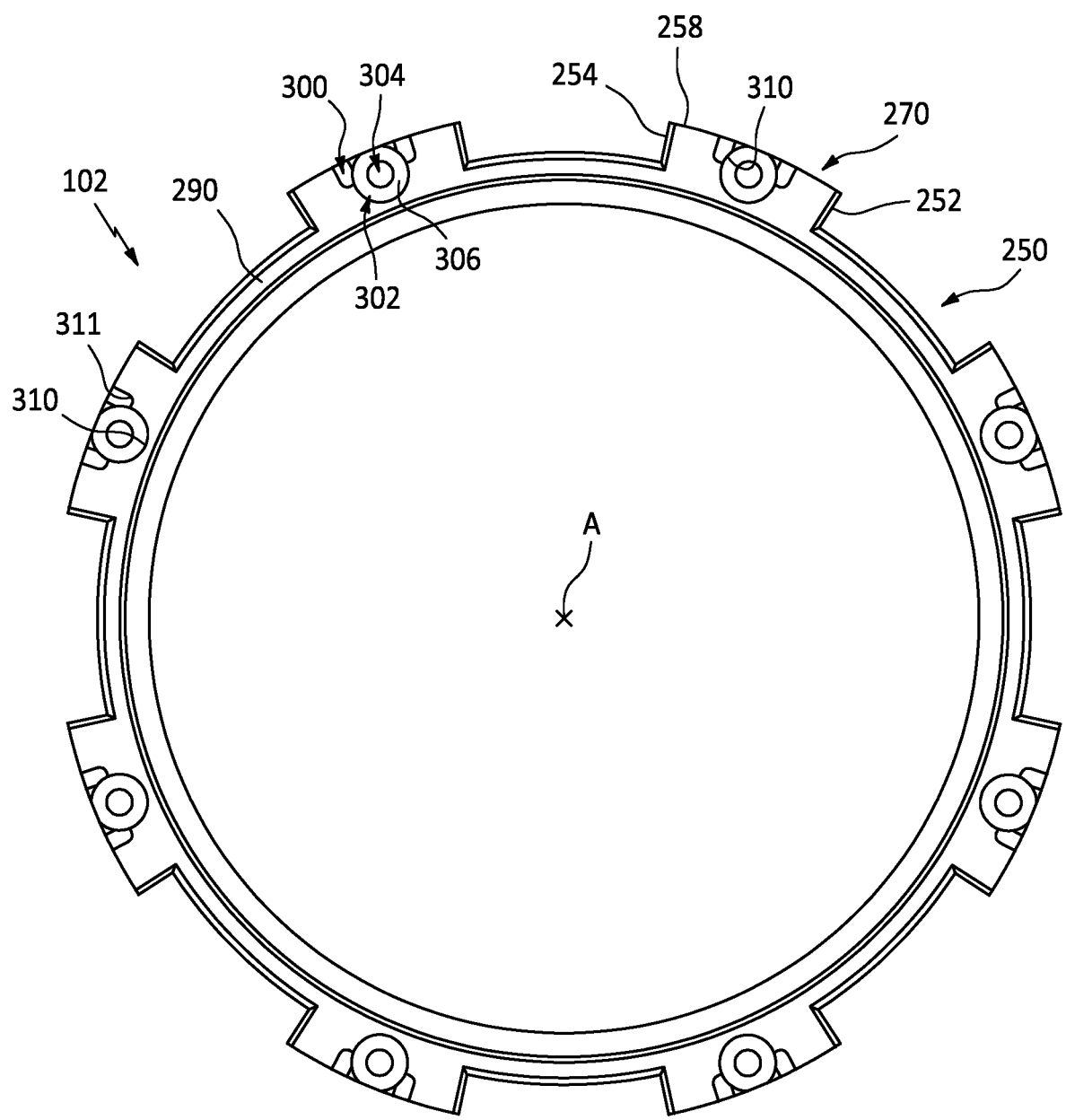
FIG. 4 is an aft end view of a carbon seal of the seal system.

FIG. 1 shows a seal system 100 having a seal 102 and a seat 104. As is discussed further below, the seal system is used in a turbomachine such as a gas turbine engine for a purpose such as isolating a bearing compartment 600. The seal is mounted to a first structure such as an engine static structure and the seat is mounted to rotate relative thereto (e.g., mounted to a shaft) about an axis A (FIG. 5) which may be the engine centerline or central longitudinal axis. As discussed below, the example seal system includes the seat as one piece and the seal as part of a cartridge subassembly (cartridge) 105 (FIG. 2).

The example seal 102 is a carbon seal having an axially-facing/radially-extending seal surface or face 106. The example seal 102 is formed as single-piece body (monoblock) circumscribing a central axis normally coincident with the centerline A.

FIG. 1 further shows an outward radial direction 502 and a forward direction 504. The seat 104 has an axially-facing/radially-extending seat surface or face 108 engaging the seal face 106. The faces 106 and 108 are axially-facing/radially extending faces. This engagement may allow relative radial displacement of seal and seat.

Figure 5:
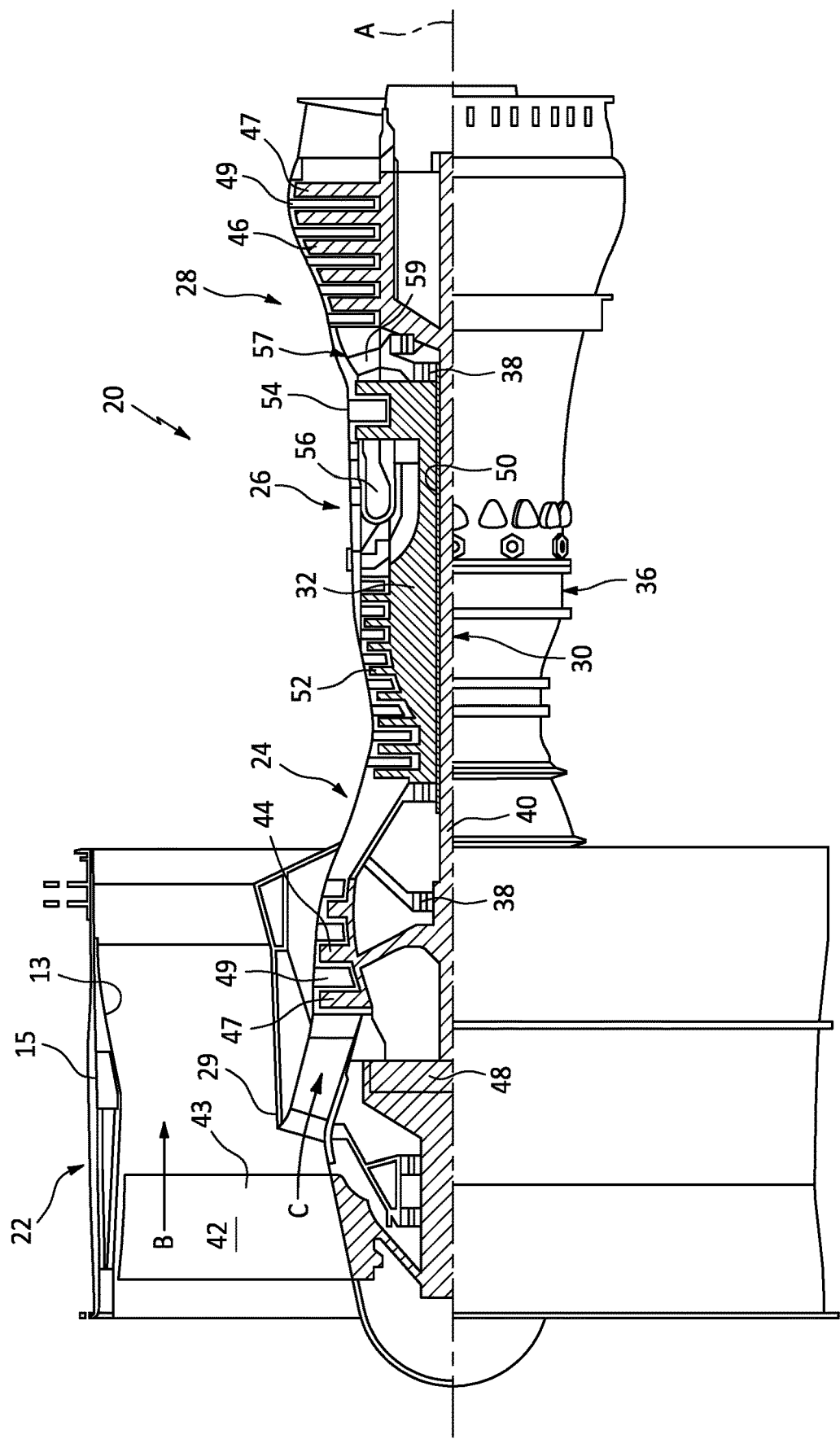
FIG. 5 is a schematic view of a gas turbine engine in which the seal system may be included.

The seal system 100 isolates a space or volume 600 from a space or volume 602. The example space or volume 600 is a bearing compartment. The example seal system is at an aft end of the bearing compartment. A similar or other seal system (not shown) may be at a forward end of the bearing compartment. The example bearing compartment 600 contains a bearing (not shown) supporting the shaft for rotation relative to the static structure about the axis A. The example second space or volume 602 is a buffer chamber. In the example engine configuration and position, a case component 120 (e.g., a strut ring/frame) of the static structure is positioned radially inboard of a gas path (core flowpath) C (FIG. 5). The example seal is an oil-cooled dry-face seal wherein an array of passageways 110 (FIG. 1) extend from respective inlet ports (not shown) at a plenum 112 (between the seat and a portion 122 of a shaft) through outlet ports (not shown) on the seat to an outer diameter (OD) rim 107 for carrying oil. The seal may alternatively be a wet face seal in that there are oil passageways to outlets on the seat face 108. Or, the seal may not have oil cooling passageways at al.

The seal system further includes a seal housing 130 and a circumferentially distributed plurality of compression coil springs 132 biasing the seal 102 into engagement with the seat 104 in the assembled engine. The housing 130 is mounted to the case component 120 such as via interference fit and/or fasteners. Example fasteners 134 (FIG. 1) are screws extending through apertures 136 in mounting ears 138 of the housing and then into threaded bores 140 of the case component 120 (or through the case component to engage nuts (not shown)).

In the illustrated example, the housing 130 indirectly engages the springs 132 via a spring carrier or adaptor 144 (FIG. 2). Alternatively, there may be direct contact. The example spring carrier 144 comprises a plate 146 (FIG. 1) having a first face 148 (aft in this example), an opposite second face 150, an inner diameter (ID) perimeter 152, and an outer diameter (OD) perimeter 154. A circumferentially distributed (e.g., evenly) plurality of projections 156 extend from the second face 150 to distal ends 158 and have lateral peripheries (peripheral surfaces) 160.

Each of the projections 156 is received in a first end portion of the associated spring 132 with the associated first end 162 of the spring abutting the second face 150. An opposite second end portion of each spring is at least partially accommodated in a respective associated compartment 170 (FIG. 2) of the seal 102. An example seal system includes, for each spring, an associated end cap or spring seat 172 receiving the spring second end portion and itself being received in the associated compartment 170. The example cap 172 (FIG. 1) has a sidewall 174 extending from a rim 176 to an apertured end web 178. The spring second end 164 is received within the interior of the sidewall and cap and abuts the interior surface or face of the web. As is discussed further below, the example web 178 has a central circular aperture 180.

With the exception of the mounting ears 138 and anti-rotation features (discussed below) for circumferentially registering and retaining the spring carrier 144 and seal 102, the housing is generally formed as a body of revolution about the axis A. The housing generally includes an inner wall 190 (inner diameter (ID) wall) and an outer wall 192 (outer diameter (OD) wall). At one end, each example wall 190, 192 (aft ends in the illustrated example) are joined to/by a radial wall or web 194 having an outer (aft in the example) surface or face 196 and an opposite inner surface or face 198. A circumferential channel 200 is formed between the walls 190 and 192 and forms a compartment that receives the spring carrier 144 with the carrier plate 146 first face 148 contacting the housing web 194 inner face 198.

The ID wall 190 and OD wall 192 each have respective ID and OD surfaces. In the example, the ID surface of the OD wall includes a circumferentially distributed plurality of inward radial projections 220 (FIG. 2). These form the housing portion of anti-rotation means restricting relative rotation of the seal 102 and spring carrier 144 on the one hand and the housing 130 on the other hand.

Each projection 220 has a respective first surface or face 222 (forward in the example), an opposite second surface or face 224, first circumferential end 226, an opposite second circumferential end 228, and an inner diameter (ID) end/surface 230.

The projections 220 are complementary to recesses 240 in the OD perimeter 154 of the plate 146 of the spring carrier 144. The recesses 240 each include first and second circumferential ends 242, 244, and a base 246. In the assembled condition, the ends 242 and 244 closely face or contact the associated ends 226, 228 of the associated projection 220. In the example, there are four projections 220 and four recesses 240.

The example seal 102, itself also has recesses 250 complementary to the projections 220 in a similar fashion to the recesses 240. However, in this example, there are eight recesses 250 so that the projections 220 can cooperate with alternate recesses 250. The recesses 250 each have a first circumferential end 252, a second circumferential end 254, and a base 256. The recesses 250 define therebetween radial outward projections 270 each containing a respective associated compartment 170. The recess 250 circumferential ends thus also define projection 270 circumferential ends. The projections also have outer diameter (OD) ends or surfaces 258.

In the example seal 102, the seal face 106 is an inner diameter portion of an end face 280 having an outer diameter portion 282 extending outward from the inner portion and slightly axially recessed therefrom. The outer diameter portion 282 falls along an annular region and then the projections 270. The seal has an opposite end face 290 (proximal and, in the example aft).

As is discussed further below, the compartments 170 each have a relatively wide/broad portion 300 near the end 290 and a relatively narrower portion 302 between the wide portion 300 and the end face 280. In the example, respective apertures or holes 304 extend from the outer surface portion 282 to the compartment narrow portion 302 leaving a shoulder surface 306. In the example of an assembled condition, the holes 304 are coaxial with the springs 132 and their caps 172. The surface 306 abuts the adjacent end of the associated cap 172 (if present, else the adjacent end of the associated spring). In the example, both the compartment wide portion 300 and the compartment narrow portion 302 are radially outwardly open to/through the surface 258. The outward radial opening of the narrow portion is narrower than the diameter of the spring or its cap 172 so that, when seated, the end portion of the spring in the compartment is radially captured in the narrow portion 302. For example, the narrow portion may be formed by over 180° of a circular cylindrical surface 310. Because the cap (or spring if no cap) outer diameter will be slightly less than this surface diameter to allow insertion, the angle may be at least 200° to still provide radial capture/retention. The radial opening provided by having this extent be less than 360° reduces weight and, depending on assembly sequence may allow easy visual confirmation of seating. If the design involve slight interference, the opening accommodates strain and provides radial access to allow forcing of the cap into a seated condition. The example wide portion 300 is wide at the OD surface 258 and has lateral shoulder surfaces 311 with an ID section being an intact section of the circular cylindrical surface 310. The shoulder surfaces may extend sufficiently radially inward to leave about 180° or slightly less of intact surface 310. This allows assembly steps where the springs are inserted radially inward and then shifted axially to seat in the narrow portions 302.

FIG. 1 further shows the seal 102 as having an inner diameter (ID) surface with a distal (forward in the example) portion 320 near the seal face 106 and a proximal (aft) portion 322 spaced radially outward from the distal portion by a tapering transition 324. In the example, the proximal portion 322 is sealed to the housing via a seal ring 330 captured in radially outwardly open channel 332 near the forward end of the ID wall 190 of the housing. The example seal ring 330 is a metallic piston ring (e.g., steel). Alternative seal rings are C-seals The piston ring has respective sealing surfaces 340, 342 in sealing engagement with the housing 130 (proximal face 336 of channel 332) and seal 102 (ID surface proximal portion 322).

FIG. 1 also shows a snap ring 360 for axially retaining the seal to the housing. The example snap ring 360 is a spiral internal snap ring captured in an ID channel 362 (having radially-extending axial end faces and an axially-extending OD base facing radially inward) of the housing outer wall 192. Although FIGS. 1 and 2 show an installed compressed state with the seal 102 disengaged from the snap ring, a pre-use state of the cartridge 105 has the seal face portion 282 contacting an axially inboard (facing the annular housing compartment 200 containing the springs) surface of the snap ring.

In one example of an assembly process, the housing is held with its end wall/web 194 downward and an opening between the ID wall and OD wall facing upward. The spring carrier 144 may then be downwardly inserted into the annular compartment 200 between the ID and OD walls. The seal ring 330 may then be installed via radial expansion and then relaxation into the channel/groove 332. Springs 132 may be installed over the projections 156 by being lowered into place. Similarly, the caps 172 (if present and not already installed to the springs) may then be lowered over the exposed end portions of the springs. The seal 102 may then be downwardly installed with the caps 172 and spring end portions passing first through the compartment 170 wide portion 300 and then into the narrow portion 302. Viewing through apertures 304 may confirm seating of the springs in the compartments 170. During this downward movement of the seal, the spring may be compressed. Viewing through the apertures 180 can allow visual inspection to verify spring seating in the caps and verify spring condition. Nevertheless, the apertures 304 and 180 are optional. Additionally the stepping of the compartment may help reduce weight and my help avoid binding between seal and spring (as does the radial offset provided by the cap sidewall). But such stepping is optional.

Additionally, the seal 102 ID surface portion 322 will pass into sealing engagement with the corresponding portion 342 of the seal 330. The example FIG. 1 seal 102 has an inner diameter bevel at its inboard end 290. While the seal 102 is held sufficiently compressed, the spiral snap ring 360 may be circumferentially/radially contracted and lowered into alignment with the channel 362 and then allowed to release and circumferentially/radially expand to be captured. Thereafter, the pre-compression force on the seal 102 may be released causing the seal to extend outward under spring 132 bias until it contacts the snap ring. The resulting cartridge 105 may be installed over the engine shaft and screwed to the static structure as discussed above. Then, the seat may be slid over the shaft making initial contact with the seal 102 and then compressing the seal against bias of the springs 132 until the seat is stopped by an abutment surface on the shaft.

In use, relative to alternative seal and associated spring constructions, the present embodiments and variations may have one or more of several advantages. Typical existing (baseline) seals utilizing coil springs, bellows springs, or wave springs have full annulus metal components such as carriers for carrying the seal and intervening between the seal and the spring. For example, a carrier may have: an outer sidewall surrounding a portion of the seal in interference fit; and a radial flange engaged by the spring (e.g., to which a bellows spring is welded). The sprung mass of such a seal includes the mass of the carbon ring, the carrier, and effectively half of the spring(s). Even if the caps 172 are present, the sprung mass may be substantially less than the sprung mass of the baseline seal system being replaced. Reduced sprung mass may then facilitate reduced spring force, leading to reduced wear for a given effective sealing ability. It may also synergistically lead to further mass reduction due to lower needed robustness, there by amplifying the improvement.

Additionally or alternatively, the seal may be more axially compact than the baseline. Because the coil springs occupy only a small circumferential portion of the seal, the springs may extend substantially closer to the seal face than would the axial end of a bellows or wave spring or ends of coil springs engaging a carrier or other support plate. This may provide a more axially compact cartridge 105 as measured by the installed axial length between the mating seat and seal faces on the one hand and the outside surface (aft in the illustrated example) of the housing web on the other hand.

Additionally, by locating the spring compartments in discrete radial protrusions, the mass of the carbon element may be reduced relative to the baseline by eliminating material circumferentially between those protrusions. Again, this may synergistically amplify other improvements.

Component materials and manufacture techniques and assembly techniques may be otherwise conventional. For example, there are numerous commercially available annular carbon seal blanks. Such a stock blank may be lathed to profile and may then have material milled and drilled away to reveal the non-annular features such as the radial protrusions and pockets. These commercial blanks are available in a variety of base carbon materials (e.g., carbon graphite and electrographite) with various impregnants (e.g., for strength/cohesion and/or lubricity) suitable for particular operating environments and conditions. The initial outer diameter of the blank may be proud of the final diameter of the projection OD surfaces 258. This allows drilling of the cylindrical holes that form each circular cylindrical surface 310 without such holes being open to the OD of the blank. Thereafter, the OD may be machined (e.g., lathed) down to the final level of the surfaces 258 and the recesses 250 and shoulder surfaces 311 machined (e.g., milled).

Example seats may be machined from an appropriate metal alloy (e.g., a stainless steel). This may be via lathing of an annular blank to a basic profile and then milling and drilling departures from annular (e.g., mounting splines, ID oil channels, and the like if present).

The housing may be formed of an appropriate metal alloy (e.g., stainless steel or a titanium alloy) and may be formed such as by pure machining/drilling of a blank or by casting and finish machining.

The spring carrier may also be formed of an appropriate alloy (e.g., stainless steel or a titanium alloy). It may be cast and/or machined. Precision may be of relatively low importance leaving the possibility of no machining or minimal machining of a raw casting. Additionally, it may formed as an assembly such as by cutting the plate from plate stock and cutting the protrusions from rod stock and welding or otherwise fastening to the plate. The springs may be cut from commercially-available spring stock and may formed of appropriate alloy such as a stainless steel or titanium alloy.

The caps may be formed of an appropriate alloy such as a stainless steel or a titanium alloy. The caps may be formed via stamping/drawing sheetstock or may be formed by rolling from sheetstock and welding abutting ends. Alternative caps may be cast of alloy or molded of a high temperature plastic.

The snap ring and seal ring may be off-the-shelf commercial products. As noted above, the example seal ring is a metallic piston ring (e.g., steel). Alternative rings are C-seals.

FIG. 5 schematically illustrates a gas turbine engine 20 as one of many examples of an engine in which the seal system 100 may be used. The gas turbine engine 20 is disclosed herein as a two-spool turbofan that generally incorporates a fan section 22, a compressor section 24, a combustor section 26 and a turbine section 28. The fan section 22 may include a single-stage fan 42 having a plurality of fan blades 43. The fan blades 43 may have a fixed stagger angle or may have a variable pitch to direct incoming airflow from an engine inlet. The fan 42 drives air along a bypass flow path B in a bypass duct 13 defined within a housing 15 such as a fan case or nacelle, and also drives air along a core flow path C for compression and communication into the combustor section 26 then expansion through the turbine section 28. A splitter 29 aft of the fan 42 divides the air between the bypass flow path B and the core flow path C. The housing 15 may surround the fan 42 to establish an outer diameter of the bypass duct 13. The splitter 29 may establish an inner diameter of the bypass duct 13. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The example engine 20 generally includes a low speed spool 30 and a high speed spool 32 mounted for rotation about an engine central longitudinal axis A (forming the axis 500) relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects, a first (or low) pressure compressor 44 and a first (or low) pressure turbine 46. The inner shaft 40 is connected to the fan 42 through a speed change mechanism, which in the example gas turbine engine 20 is illustrated as a geared architecture 48 to drive the fan 42 at a lower speed than the low speed spool 30. The inner shaft 40 may interconnect the low pressure compressor (LPC) 44 and low pressure turbine (LPT) 46 such that the low pressure compressor 44 and low pressure turbine 46 are rotatable at a common speed and in a common direction. In other embodiments, the low pressure turbine 46 drives both the fan 42 and low pressure compressor 44 through the geared architecture 48 such that the fan 42 and low pressure compressor 44 are rotatable at a common speed. Although this application discloses geared architecture 48, its teaching may benefit direct drive engines having no geared architecture. The high speed spool 32 includes an outer shaft 50 that interconnects a second (or high) pressure compressor (HPC) 52 and a second (or high) pressure turbine (HPT) 54. A combustor 56 is arranged in the example gas turbine 20 between the high pressure compressor 52 and the high pressure turbine 54. A mid-turbine frame 57 of the engine static structure 36 may be arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

Airflow in the core flow path C is compressed by the low pressure compressor 44 then the high pressure compressor 52, mixed and burned with fuel in the combustor 56, then expanded through the high pressure turbine 54 and low pressure turbine 46. The mid-turbine frame 57 includes airfoils 59 which are in the core flow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of the low pressure compressor, or aft of the combustor section 26 or even aft of turbine section 28, and fan 42 may be positioned forward or aft of the location of gear system 48.

The low pressure compressor 44, high pressure compressor 52, high pressure turbine 54 and low pressure turbine 46 each include one or more stages having a row of rotatable airfoils. Each stage may include a row of static vanes adjacent the rotatable airfoils. The rotatable airfoils and vanes are schematically indicated at 47 and 49.

The use of "first", "second", and the like in the following claims is for differentiation within the claim only and does not necessarily indicate relative or absolute importance or temporal order. Similarly, the identification in a claim of one element as "first" (or the like) does not preclude such "first" element from identifying an element that is referred to as "second" (or the like) in another claim or in the description.

One or more embodiments have been described. Nevertheless, it will be understood that various modifications may be made. For example, when applied to an existing baseline configuration, details of such baseline may influence details of particular implementations. Accordingly, other embodiments are within the scope of the following claims.

What is claimed is:

1. An apparatus comprising:
a first member;
a shaft rotatable relative to the first member about an axis; and
a seal system comprising:
a seal carried by the first member and having a seal face;
a seal housing;
a seat carried by the shaft and having a seat face in sliding sealing engagement with the seal face; and
a plurality of coil springs biasing the seal face against the seat face, each coil spring having a first end and a second end,
wherein:
the seal has a plurality of spring compartments;
each of the plurality of spring compartments comprises an outward radial opening; and
each of the plurality of coil springs is partially within a respective associated compartment of the plurality of spring compartments.

2. The apparatus of claim 1 further comprising a plurality of caps each having a sidewall extending from a rim to a web, the web having an interior surface and an exterior surface and wherein:
each of the plurality of coil springs has an end portion at the second end in an associated cap of the plurality of caps and abutting the interior surface of the web.

3. The apparatus of claim 2 wherein the plurality of spring compartments each comprise:
a base portion receiving the associated cap; and
a shoulder separating the base portion from a broader portion.

4. The apparatus of claim 3 wherein the plurality of spring compartments each comprise:
a port open to the base portion.

5. The apparatus of claim 4 wherein for each of the plurality of spring compartments:
the outward radial opening has, a portion along the compartment base portion narrower than a portion along the compartment broader portion; and
the port is coaxial with the associated spring.

6. The apparatus of claim 1 further comprising:
a spring carrier within the housing and having a plurality of projections each respectively received in an associated spring of the plurality of coil springs and wherein the plurality of springs bias the seal away from the spring carrier.

7. The apparatus of claim 6 wherein:
the spring carrier has an annular plate portion from which the projections axially project.

8. The apparatus of claim 7 wherein:
the spring carrier plate portion and housing have complementary interfitting features restricting relative rotation.

9. The apparatus of claim 1 wherein:
each compartment of the plurality of compartments is formed in an outward radial projection of the seal having respective first and second circumferential ends and interfitting with complementary features of the housing to restrict relative rotation.

10. The apparatus of claim 1 wherein:
the seal is a carbon seal.

11. The apparatus of claim 1 wherein:
the seat is steel.

12. The apparatus of claim 1 wherein:
the seal is a single piece.

13. The apparatus of claim 1 further comprising:
an internal snap ring captured in an internal groove of the housing and positioned to limit movement of the seal.

14. The apparatus of claim 1 further comprising:
a seal ring captured in an outwardly-open channel of the housing and engaging an inner diameter surface of the seal.

15. The apparatus of claim 1 being a gas turbine engine.

16. A carbon seal comprising in a single piece:
a sealing face circumscribing a central longitudinal axis; and
a plurality of compartments each having a first axial opening axially opposite the sealing face, each compartment of the plurality of compartments has an outward radial opening contiguous with that compartment's first axial opening,
wherein:
each compartment of the plurality of compartments is formed in an outward radial projection of the carbon seal having respective first and second circumferential ends; and
each compartment has a surface for abutting an end of a spring or spring cap received in the compartment.

17. The carbon seal of claim 16 wherein:
each compartment of the plurality of compartments has a second axial opening axially opposite to and smaller than that compartment's first axial opening.

18. The carbon seal of claim 16 being at least 90% carbon by weight.

19. A carbon seal comprising in a single piece:
a sealing face circumscribing a central longitudinal axis; and
a plurality of compartments each having a first axial opening axially opposite the sealing face, each compartment of the plurality of compartments has an outward radial opening contiguous with that compartment's first axial opening,
wherein each compartment of the plurality of compartments has:
a base portion; and
a shoulder separating the base portion from a broader portion.

20. The carbon seal of claim 19 wherein for each compartment of the plurality of compartments the outward radial opening along the base portion is narrower than along the broader portion.

21. A carbon seal comprising in a single piece:
a sealing face circumscribing a central longitudinal axis; and
a plurality of compartments each having a first axial opening axially opposite the sealing face, each compartment of the plurality of compartments has an outward radial opening contiguous with that compartment's first axial opening,
wherein:
each compartment of the plurality of compartments has a second axial opening axially opposite to and smaller than that compartment's first axial opening.

* * * * *